United States Patent
Mack et al.

[11] Patent Number: 6,158,031
[45] Date of Patent: Dec. 5, 2000

[54] AUTOMATED CODE GENERATING TRANSLATOR FOR TESTING TELECOMMUNICATION SYSTEM DEVICES AND METHOD

[75] Inventors: Keith A. Mack, Montgomery, Ill.; Kenneth Onyema, Revere, Mass.

[73] Assignee: Lucent Technologies, Inc., Murray Hill, N.J.

[21] Appl. No.: 09/149,369

[22] Filed: Sep. 8, 1998

[51] Int. Cl.⁷ ............................ G01R 31/28; G06F 17/60
[52] U.S. Cl. ................. 714/724; 714/733; 714/734; 709/218; 709/220; 709/221
[58] Field of Search ................. 209/200, 202, 209/213, 218, 220, 221, 222, 223, 224, 225, 226; 714/724, 733, 734, 736, 712, 33, 43, 32

[56] References Cited

U.S. PATENT DOCUMENTS

| | | | |
|---|---|---|---|
| 5,230,049 | 7/1993 | Chang et al. ........................ | 395/700 |
| 5,394,540 | 2/1995 | Barrington et al. .................. | 395/500 |
| 5,487,169 | 1/1996 | Vraney et al. ....................... | 395/700 |
| 5,557,539 | 9/1996 | Fitch .................................... | 364/514 |
| 5,880,974 | 3/1999 | Tarumi et al. ....................... | 364/578 |

*Primary Examiner*—Ayaz R. Sheikh
*Assistant Examiner*—Tim Vo

[57] ABSTRACT

A system for testing a communication network component connected to a computer controlled apparatus via a data link in which the system automatically simulates telephonic communication with the communication network component. Device communication specification information is sent to a translator device at the computer controlled apparatus which automatically parses the received device communication specification to enable development of test tools for the simulation of telephonic communication between the computer controlled apparatus and the communication network component employed as a system under test. The translator in response to receipt of the device communication specification automatically generates a computer software based model to simulate a network entity, test scripts, and user documentation guide.

20 Claims, 4 Drawing Sheets

AUTOMATED CODE GENERATING TRANSLATOR FOR TESTING TELECOMMUNICATION SYSTEM DEVICES AND METHOD

BACKGROUND OF THE INVENTION

This invention relates to the testing of telecommunication apparatuses and more particularly to testing devices used in testing telecommunication switching and signaling systems.

In a telephonic testing environment, simulated telecommunication test devices communicate with designated switching and signaling systems. The various switching and signaling systems are tested to determine their operational performance under certain telephonic events. In conventional testing devices, simulators are employed. Simulators are collections of state machines that simulate the behavior of external devices which communicate with the system under test (SUT), such as a telephonic switching and signaling system. Simulators are generally seen as a computer program in which a computer generated model represents an external device, system or process.

Simulators are designed to model the correct behavior of external devices or network entities (such as switches, data bases, telephone sets, wireless base stations, etc.) as observed by looking into the device through a communication link from the system under test. For example, in a GSM (Global System for Mobile Communication) environment, to test telephonic network entities in a laboratory environment, engineers must obtain the Abstract Syntax Notation One (ASN.1) specification for a particular telephonic device. ASN.1 is the Open Systems Interconnection (OSI) standard language to describe data types and includes the messaging standard specification (protocols and programming languages) for telephonic devices.

Unfortunately, in known testing systems, the engineer is required to perform the tedious task of manually writing such simulation programs conforming to protocol to simulate the behavior of certain external telephonic devices.

In known telecommunication testing scenarios, a systems test programmer is required to design and implement a protocol message either manually or with the use of a complier. Subsequently, test scenarios are manually developed to verify that tool development is successful and to test the device or system under test. Once again the testing personnel must manually write many various commands or test scripts to send messages in accordance with the specification of the particular telephonic device to the system being tested. Additionally, the testing personnel are required to know the particular messages which are supported by the system under test (SUT) and the commands which trigger the messaging between the simulated telephonic device and the SUT. Finally, a user guide must manually be developed to document the content of the messages supported by the SUT and to document which commands trigger the messaging.

Disadvantageously, the manual process of testing telecommunication devices in using such known approaches is extremely tedious and time consuming. Also, the known manual approach for testing various telecommunication devices has been found to be prone to much human error which is introduced when generating designs, code, user documentation and test scripts by hand. Unfortunately, known methods of testing have been found to be lengthy and take months of effort to deliver an ASN.1 related feature. Therefore, there is a need in the art to quickly, accurately and efficiently test telecommunication systems and for generating user documentation in an automated fashion.

SUMMARY OF THE INVENTION

The problems noted above are solved in accordance with the present invention and a technical advance is achieved in the art, by a computer controlled apparatus for simulated testing of various communication network components in which a translator device is employed for automatically generating test tools used in the testing of a communication network component. In particular, a stored device communication specification such as an ASN.1 specification is received at a translator device. The ASN.1 document specification information is parsed and message templates are sorted to provide automatic generation of: computer software based models to simulate operations of network entities; event driven programs in a tool control language for different test scenarios and user documentation guides. In some cases, private data information which is outside of a standard device specification is selectively inputted to the translator to permit testing of proprietary communication components which do not necessarily incorporate telephonic standard specifications. The automatic generation of communication device test tools significantly reduces the development cycle for testing communication systems as well as the technical effort required to support new or updated versions of existing protocols defined in ASN.1.

BRIEF DESCRIPTION OF THE DRAWINGS

The advantageous features of the invention will be explained in greater detail and others will be made apparent from the detailed description of the preferred embodiment of the present invention which is given with reference to the several figures of the drawing, in which.

DETAILED DESCRIPTION

Figure 1:
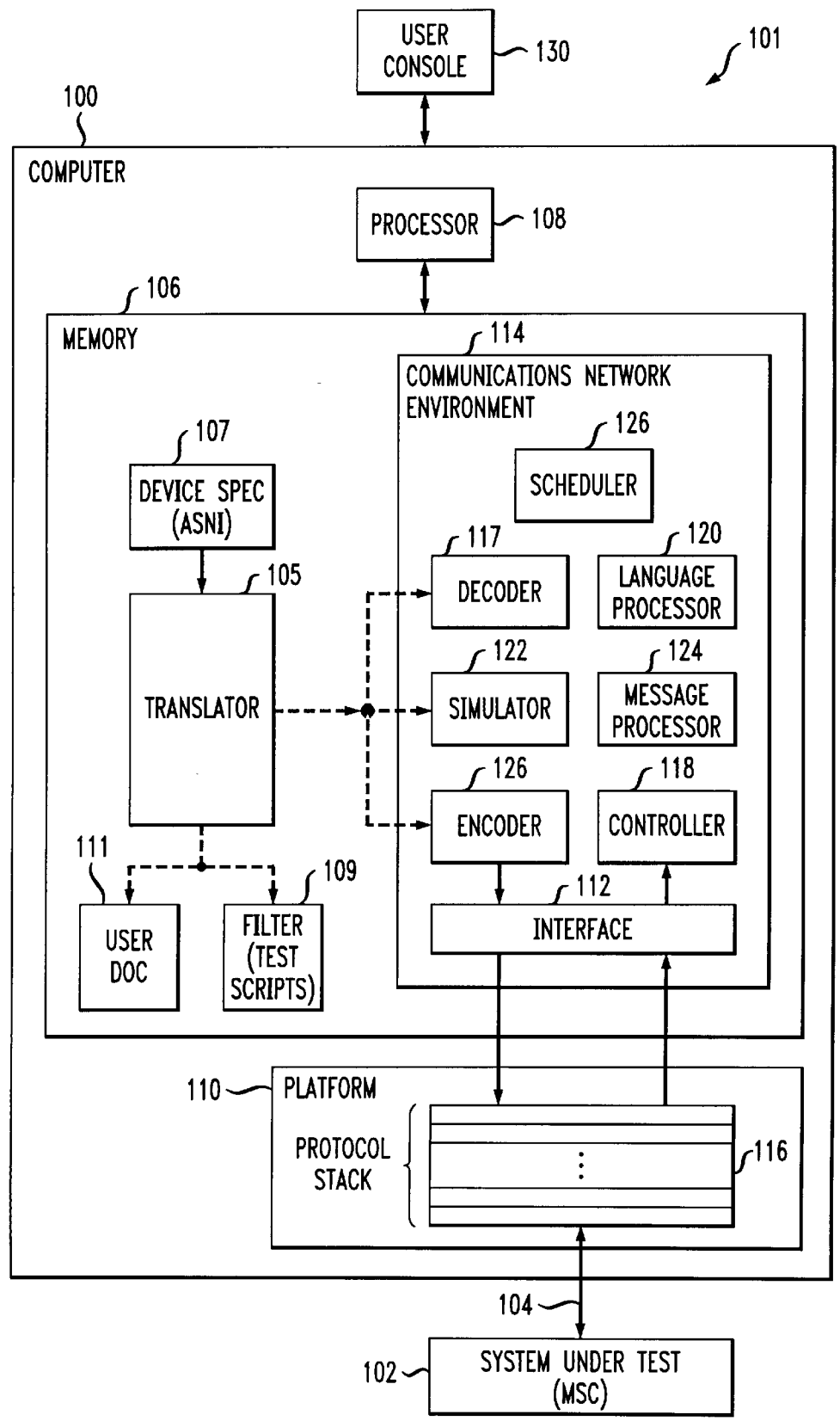
FIG. 1 is a block diagram illustrating a system under test communication network component connected to a computer controlled testing apparatus of the present invention.

Referring to FIG. 1, the automated simulated communication testing system 101 described herein is suitable for programs that run on a digital computer 100. Digital computer controlled apparatus 100 is connected to a communication network component being a system under test (SUT) 102 via data link 104. In this exemplary embodiment, the SUT communication network component 102 is a mobile switching center (MSC) and data link 104 is an A interface, as shown in the art; however, the present invention is not limited to testing MSCs. Other communication network components, such as switching systems, network consol points, base station subsystems (BSS), visitors location register (VLR), home location register (HLR), equipment identification register (EIR), and the like, may be tested using the system and method of this invention without departing from the scope of this invention.

In accordance with the present invention, the system includes a novel translator 105 for simplifying the development of test tools used in testing complex switching and signaling systems. The translator 105 accepts a device communication specification preferably Abstract Syntax Notation One (ASN.1) specification information 107 stored in memory 106 as input and automatically generates: 1) simulator models (preferably in the form of software based designs) of the behavior of network entities such as switches, data bases, phone sets, wireless base stations; 2) software for various test scenarios written in terms of actions such as registering a mobile, going off-hook, dialing a number (test scripts, filters); and 3) user documentation. The generation of such output from the translator 105 is done automatically in response to its receipt of ASN.1 specification as input, and through receipt of an optional test scenario specification encompassed in the device specification 107.

The computer based system 100 performs the behavior of a preselected device to be simulated as identified in the selected ASN.1 specification 107. When initiating laboratory environment testing of the communication network component 102, the ASN.1 device communication specification 107 is sent to the translator device 105 at the computer controlled apparatus 100. The translator 105 automatically parses the received device communication specification 107 to enable the development test tools for the simulation of telephonic communication between the computer controlled apparatus 100 and the SUT 102. In response to receipt of the ASN.1 specification, the translator automatically generates appropriate test tools for use in testing the communication network component SUT 102. This includes the automatic generation of a computer software based model provided as a simulator 122 to simulate a network entity as output from the translator 105. Preferably, the computer software based model to simulate the behavior of a network entity that is outputted as a simulator 112 at the communications network environment 114 in memory 106 is provided in C++ executable software code. The simulated network entity provided at the simulator 122 in the form of a computer software based model may selectively be a simulation of either a) a telephonic network switch, b) a data base, c) a wireless base station, or d) a telephonic set.

The translator 105 automatically generates test scripts 109 (also referred to as filter) in the form of computer software based test scenarios to simulate telephonic actions. This is done by automatically creating event driven software program(s) preferably in a tool control language for establishing test scenarios. Alternatively, modification of messages may be selectively performed by employment of a scenario specification. The test scripts 109 may selectively simulate one or more of the following telephonic actions: a) registering a mobile telephonic unit, (b) dialing a telephonic number, and (c) going off hook. The translator device 105 of the present invention significantly reduces the development cycle intervals as well as the technical effort required to support either new or updated versions of existing protocols defined in ASN.1. The translator 105 further reduces the number of faults that are introduced when generating designs, code, user documentation and test scripts manually.

The system and method of the present invention automates the entire process of simulating telephonic communication for testing a device under test 102. Automatic generation of high level language code such as C++ for the behavior of network entities is accomplished. Event driven programs in a tool control language are automatically generated such as the filter language 109 for different test scenarios. A user guide document 111 is automatically generated in response to receipt of the ASN.1 specification at the translator 105 and is preferably in a format such as NROFF/TROFF document format. The code necessary to encode, decode, test and document a message is automatically generated.

The steps for carrying out the tasks performed by computer 100 are stored as encoded instructions in the memory device 106 and are examined by a processor 108 which interprets them to carry out actions using its own internal machinery, devices, and functions. The collection of steps controlling processor 108 are commonly called a program. The program is divided into conceptual parts having functional relationships to each other called processes. Each process occupies a portion of memory 106 as it is run by the underlying operating system (not shown). In the preferred embodiment of this invention, the underlying operating system is the UNIX® operating system.

Two main processes (112 and 114) are shown for clarity for operation on computer 100. In reality, there would be several more processes to control the house-keeping and other functions of computer 100. Platform 110 provides the hardware and software interface between digital link 104 and computer 100. Platform 110 includes a protocol stack 116 which translates messages from MSC 102, in the protocol used by MSC 102 by stripping off any protocol layers, and receiving messages for the MSC 102 and adding protocol layers expected by MSC 102. In this exemplary embodiment protocol stack 116 receives messages from 102 and strips the bottom three layers of the SS7 protocol to present the remaining layers (including the user message portion) in SCCP primitives, as is defined by the CCITT Blue Book, Volume VI, Fascicle VI.7, Specifications of Signaling System, No. 7, Recommendations Q.711–Q.716, ISBN 92-61-03531-0. In the preferred embodiment of this invention, the platform is a DCT-6000 as available from ISDN technologies Corp. of Mountain View, Calif.

Protocol stack 116 delivers messages to and receives messages from interface process 112. Interface process 112 provides further translation of the message to primitives, as will be described further, below. Interface process 112 delivers messages to a communications network environment (CNE) process 114 according to the preferred embodiment of this invention.

CNE process 114 comprises a plurality of subprocesses, some of which include further sub-processes. In programming terms, CNE process 114 is a "large" process, comprising a plurality of "medium" processes, some of which comprise "small" processes. In the preferred embodiment of this invention, CNE process 114 comprises controller 118, decoder 117, language processor 120, simulator 122, message processor 124, encoder 126 and scheduler 128. Controller 118 is the entry point of the process, which initializes the other medium processes upon system initialization, as is known in the art. Controller 118 also receives incoming messages from interface process 112, and receives incoming requests from test user console 130. Preferably coupled with the processor 108 of the computer controlled testing device 100. Decoder 117 receives messages from interface 112 via controller 118 and translates each message from primitives into a template. In accordance with the present invention, the encoder/decoder 126, 117 and the simulator 122 are established as being outputs of the translator device 105. Language processor 120 receives incoming requests from console 130 via the computer device and through controller 118, translates the requests, and provides input to the simulator 122 and, message processor 124.

Simulator 122 provides simulation of network component (s) that interact with, or whose interactions affect the system under test 102. In the exemplary embodiment of this invention, simulator 122 simulates base station systems (BSSs) and mobile stations (MSs) that communicate with an MSC 102. Each network component process in simulator 122 is a small process comprising a state/event/response machine programmed according to the function being simulated. Simulator 122 is responsive to messages from MSC 102 to take appropriate action and change state, and responsive to user input from test user console 130 (via language processor 120) to change state and take appropriate action. Primarily, the action taken by the small processes in simulator 122 is to receive messages from MSC 102 and to send responsive messages back to MSC 102.

Message processor 124 intercepts all messages exchanged between MSC 102 and simulator 122, in order to determine if any of the messages are of interest to the tester and, if so, to manipulate the message in a predetermined way. Message processor 124 accepts input from the user via language processor 120 for intercepting predefined messages for examining response messages and changing, deleting, reporting to the test user and observing verification of handling of error condition messages before delivery. Message processor 124 then sends the intercepted messages to simulator 122 for messages from MSC 102 or to an encoder 126 for messages to MSC 102.

Encoder 126 receives messages from message processor 124 destined for MSC 102, formats the messages into the form expected by protocol stack 116, and sends them to protocol stack 116. Each of the medium processes has a message queue which stores pointers to messages from other processes and notifies the scheduler that a process has work to do and needs to be run. Such messages may be from MSC 102, to MSC 102, or a request to take some internal action. For further details on the communications network environment and the modification of messages from a system under test reference can be made to U.S. Pat. No. 5,394,540, issued Feb. 25, 1995, to Barrington et al. entitled "System For Testing a Network Component By Selectively Modifying Messages Received From the Component and Returning To a Simulator" which is incorporated herein by reference.

The outputted simulator 122 provides an accurate model of the behavior of the simulated entity as seen from the interface 112 from the system under test 102. The simulator 112 represents functions or actions that are normally performed or initiated using actual subscriber or network device. The effect of the function or action appears the same to the SUT 102 as if the actual device were used.

The outputted filter 109 (preferably in the form of test scripts) provides protocol level testing capabilities. The filter 109 provides programs that are installed around the simulated entities. Intercept and detect messages (primitives, messages or events) exchanged between the automated simulated communication testing system 101 and the SUT 102 allow a tester to modify or delete the primitive/message, or substitute one or more replacement messages. The filter 109 which acts as a test script provides a command language called filter specification language (FSL) which detects a desired event and then takes an action. An example of an event is the arrival of a base station subsystem mobile application part (BSSAP) message from a mobile switching center which can be selectively employed as an SUT 102. An example of actions is testing for a specific message type, changing the value of a subfield in the message and sending it onto the simulator 122.

The encoder 117 and decoder 126 translate primitives/messages from an internal template format into a byte string based on the protocol rules. They also translate protocol primitives/messages from a byte string format into an internal template format based on the protocol rules. Encoders are installed at the top of the protocol stack providing fully automatic processing of messages such as signaling system No. 7 (SS7) MTP (message transfer part) and signaling connection control part.

Figure 2:
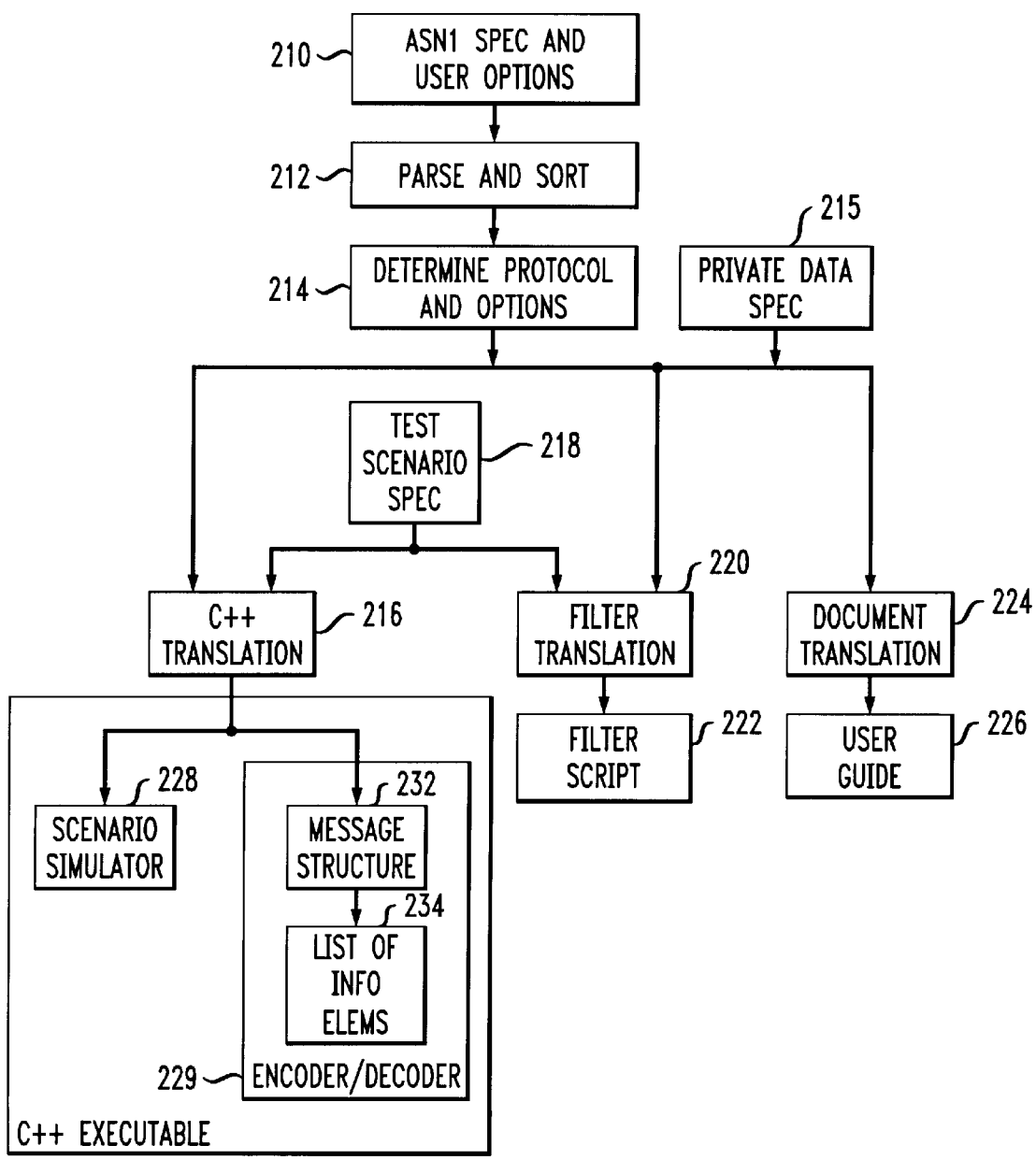
FIG. 2 is a flow chart of the processing steps performed at the translator device of the computer controlled testing apparatus of the present invention.

The translator 105 provides ASN.1 specification 107 to device code translation 216, as seen in FIG. 2, which is preferably outputted in the form of C++ executable software program code. Code translation involves generating dependent and independent components. Behavior of the independent components does not change based on the input ASN.1. The major functional parts of the independent components are encoders 126 and decoders 117. The encoder 126 and decoder 117 translate between internal representations of protocol messages/primitives and the bit sequences specified by the protocol definitions.

Referring now to FIG. 2, the processing steps performed at the programmed translator device of the computer controlled apparatus of the present invention for automatically generating test tools including user guide documentation, simulated computer software models of network entities and various telephonic action test scenarios are shown. The translator device 105, FIG. 1, is programmed and stored in the memory device 106 which receives ASN.1 specification and private data specification information and converts it into an executable software programming language in a different form to enable automatic simulated testing of the system under test. In step 210, FIG. 2, the ASN.1 specification and user options for the particular testing application are transmitted and received at an input of the translator device 105, FIG. 1. Preferably, the ASN.1 specification information and the user options are inputted to the translator 105 through employment of the user console 130. Input of the device communication specification 107 and used options are invoked preferably through command line options or a graphical user interface at the user console 130 coupled to the computer controlled testing apparatus 100.

In step 212, FIG. 2, pre-translation is performed for general formatting of the input ASN.1 specification before invoking various parts of the translator 105 responsible for generating the requested result. Pre-translation 212, FIG. 2, parses the input ASN.1 specification 107, FIG. 1, and converts it into the expanded ASN.1 format. The step of pre-translation 212, FIG. 2, further processes the received private data specification as seen inputted in step 215. Private data specification information 215 generally includes non-standard fields of a message. An extra field that is added to a standard message is referred to as private data 215. Private data specification processing 215, FIG. 2, involves appending to various messages contained in the specification 107, FIG. 1, any private data fields associated with them by processing a file containing private data information. The pre-translation step 212 of FIG. 2 further sorts the messages contained in the ASN.1 specification file preferably in alphabetical order.

In step 214, FIG. 2, the protocol type and other user configured parameters (for example, components to generate, the version of the specification, etc.) are determined because the user may selectively specify the version of a standard application (i.e. GSM MAP phase two). In step 214, FIG. 2, the user options are also determined as whether to generate code for network entity simulation, various test scripts, user documentation or to generate one or all of them.

Figure 5:
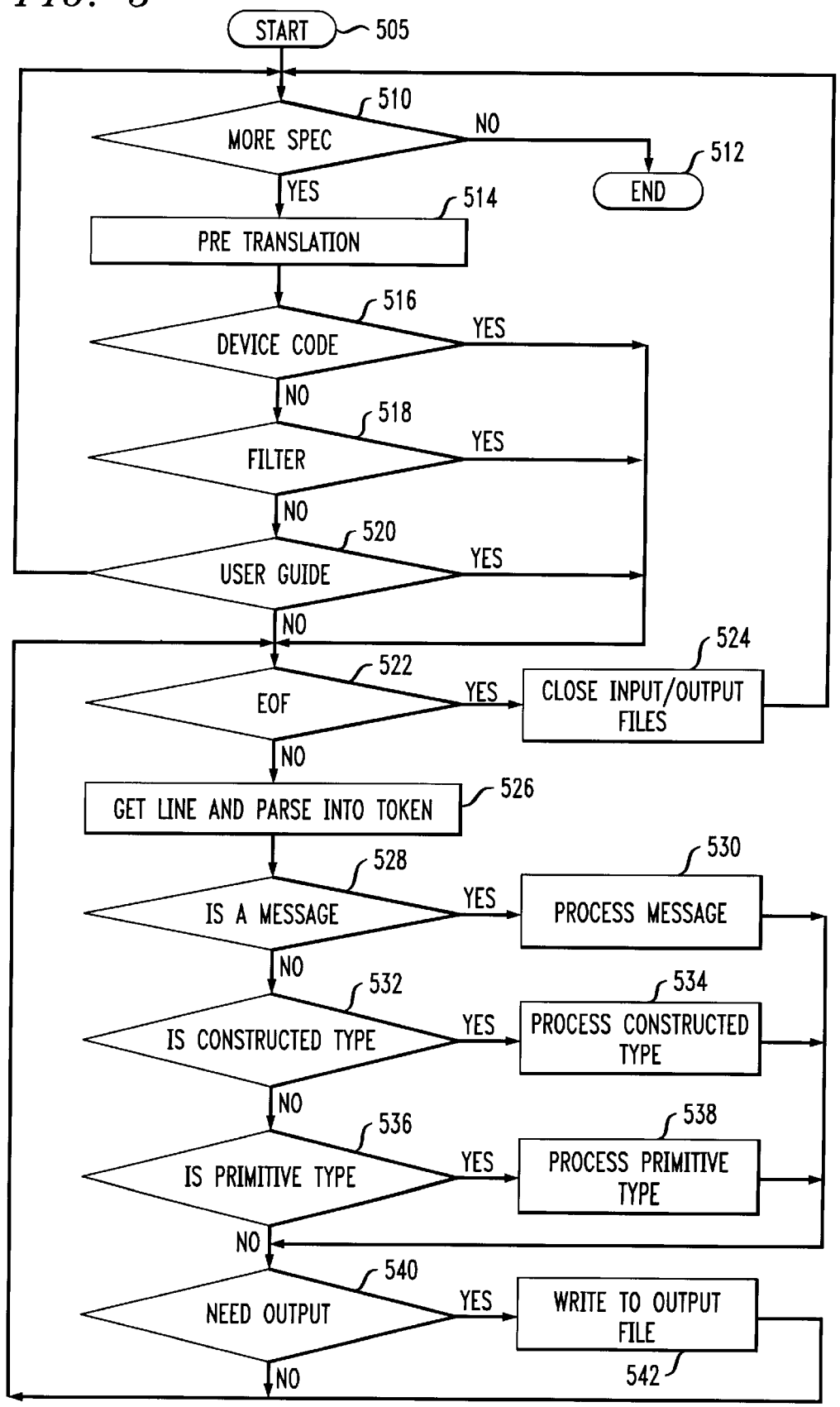
FIG. 5 is a flow chart illustrating the translation steps accomplished at the translator device of the computer controlled testing apparatus of the present invention.

Next, the steps of translation are performed specifically involving the C++ executable software code translation 216, filter translation 220 and the document translation 224. The translation steps 216, 220, 224 as described in further detail in FIG. 5 are performed at the translator 105, FIG. 1, to selectively choose mnemonics different from an earlier version by appending or pre-pending a version number to the mnemonic.

In step 216, the translator 105 automatically provides translation of the received device specification 107, FIG. 1, and preferably converts it to C++ executable software code. The translation is further described in detail in FIG. 5. In performing the C++ translation in step 216, the translator utilizes received test scenario specification, as seen in step 218, for the particular test scenario to be simulated for testing. The test scenario specification may be optionally provided with the ASN.1 specification which is inputted preferably as a user option at the user console 130 for receipt by the translator 105. The test scenario specification 218 is also employed in performing the step of filter translation 220 once pre-translation has been accomplished. Upon completion of the filter translation 220 at the translator 105, FIG. 1, a filter script 109 is outputted from the translator as seen in step 222, FIG. 2. The translator 105, FIG. 1, determines whether the user desires to test upper or lower bound of a type, and generates a corresponding filter 222, FIG. 2. The filter translation is described further in FIG. 5. In step 224, FIG. 2, the translator 105, FIG. 1, performs the document translation after pre-translation has been accomplished. A user document 111, FIG. 1, is outputted from the translator 105 as seen in step 226, FIG. 2. The document translation steps to automatically develop a user guide are described further in FIG. 5.

Once the C++ executable software code translation is accomplished in step 216, the simulator 122, FIG. 1, in the form of a computer software based model for the test scenario is automatically generated as seen in step 228. Scenario simulator 228 provides an accurate model of the behavior of the simulated entity as seen from the appropriate system under test (SUT) 102 interface. The inputted scenario specification 218 is preferably a graphical or textual representation of the order in which specific messages should be sent and/or received. If generation of scenario simulator 228, FIG. 2, is selected, the translator 105 processes the scenario specification and determines what messages to construct or expect. If a message is to be sent, the translator generates a code that employs the encoder 126. The encode method for a particular message constructs a corresponding bit stream. If a message is received, the translator generates code that uses the decoder 117. The decoder determines whether the message is valid and has the right content. If scenario specification is not inputted, choice type with multiple fields generates filter script as seen in step 222, scenario simulator 228 containing all fields; however, it comments out all fields with the exception of the first field. Additionally, the encoder 126 and decoder 117 are generated from the C++ executable code which is outputted from the translator 105 as seen in step 229, FIG. 2. The encoder decoder 229 provides encoding and decoding of messages as is described further herein. The outputted encoder/decoder 229 is provided with message structure as seen in step 232 and the software coded list of information elements as seen in step 234. The message structure 232, or piece of it that applies to the particular field, is passed as an argument for decoding and storing the data.

Figure 3:
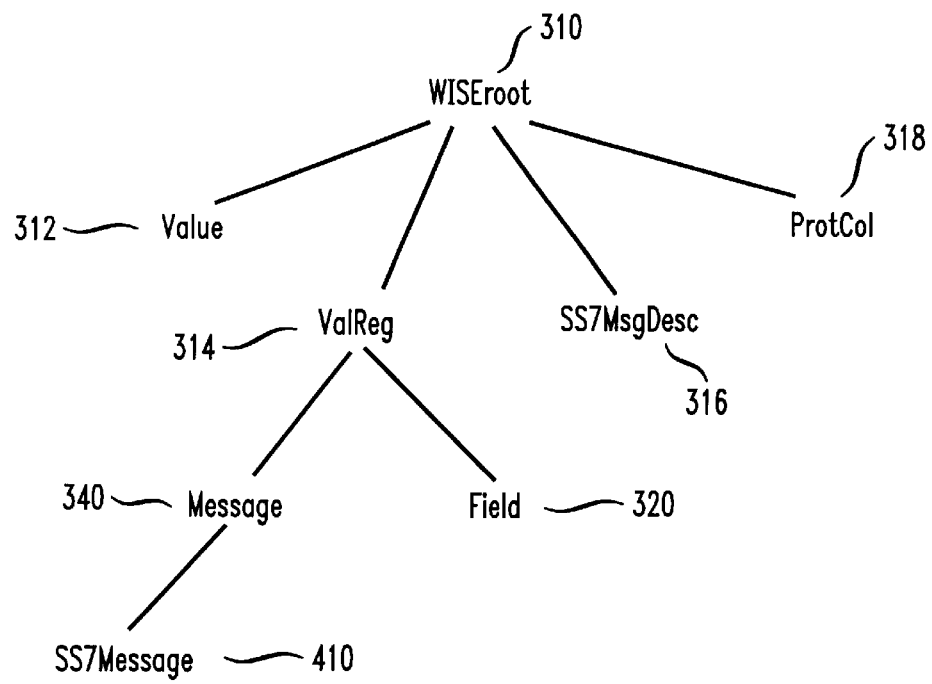
FIG. 3 is a class hierarchy diagram illustrating a graphic representation of class objects of the system class hierarchy.

Referring now to FIG. 3, a class hierarchy diagram is shown for a graphic representation of the system class hierarchy. Wiseroot 310 is the root of the objects classes. This class provides member functions which allow a particular object to identify its type and/or whether it is derived from another class in the hierarchy. The Value 312 and ValRep 314 classes exist primarily for memory management. Value 312 class objects contain a pointer to an instance of a to ValRep 314 class object (or a descendant of the ValRep class). The ValRep class object 314 contains a counter which is used to keep count of the number of references pointing to it.

Figure 4:
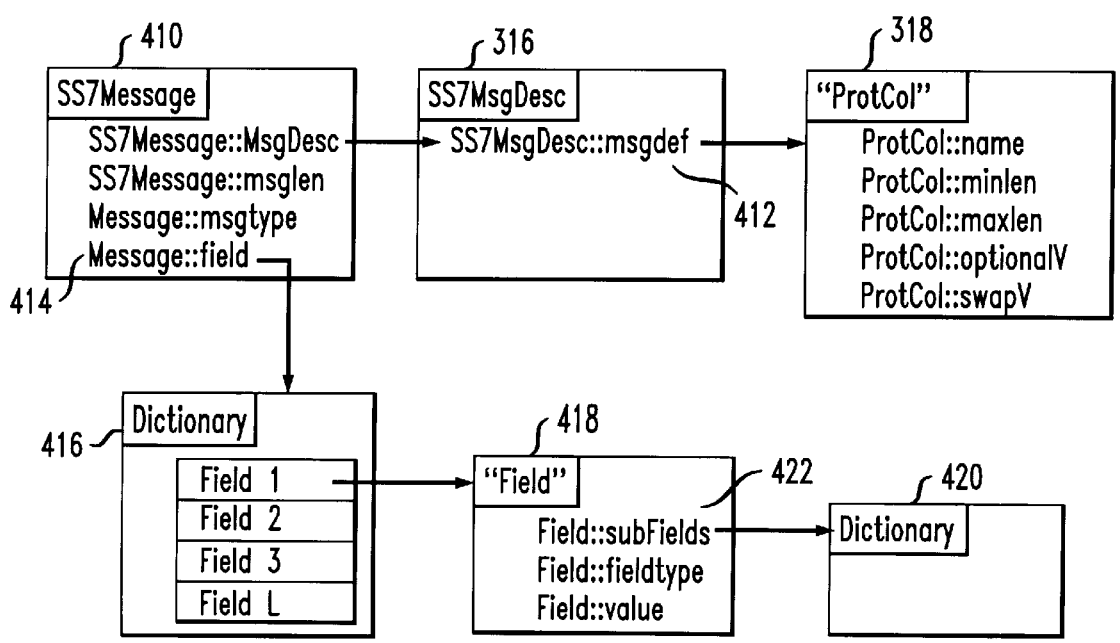
FIG. 4 is an encoder/decoder access diagram illustrating an internal representation of a message that is intended to be sent or received from the system under test.

The SS7 MsgDesc 316 class, FIG. 3, describes a Signaling System 7 (SS7) message. An SS7 message refers to any message that is intended to be encoded and sent over the link 104, FIG. 1, to the SUT 102. The SS7 MsgDesc 316, FIG. 3, contains msgdef 410, FIG. 4, which is a pointer to an object type ProtCol 318. Messages encode and decode member functions. The SS7 Message 410, FIG. 4, provides access to the messages and fields of the messages. The SS7 message 410 provides access externally to the end users and internally to the system. This enables the simulator 122, FIG. 1, to access the messages that are sent and received.

The SS7 Message 410 class, FIG. 4, contains a member called fields 414. Fields 414 is a dictionary 416 which contains the data (value) of the fields in a message. The type of object in the fields dictionary 416 is preferably a derivative of the Field 418 class as shown in FIG. 4. The Field object 418 also contains a dictionary 420 to store the data for the sub-fields, which is called SubFields 422. A SubField 422 may selectively have a Field as a value which may have another dictionary. The dependent section of the translator 105, FIG. 1, can therefore construct a message as deep as required by the Protocol. Field 418 may selectively also have a message for a value. By this, messages are contained in fields of other messages. SS7 message objects 410 also contain a pointer to an SS7 message descriptor 316. The message descriptor 316 is used to describe the structure of the message. This is the static description of the message. Because this information is the same for all SS7 Message 410 of a particular type, only one copy of this descriptor is required per message type. All instances of each message type point to the descriptor of that message.

The SS7MsgDesc class 316 has a msgdef 412, which is a pointer to an object derived from the ProtCol class 318. These objects contains pointers to other ProtCol class derivative, and therefore can also be an indefinitely long sequence of objects. The message structure that describes the message, likewise, can selectively describe a message infinitely deep.

The translator 105 builds up the codes which behave as encoders and decoders to process messages thereby decode incoming messages and encode outgoing messages.

Decoding: All objects derived from the ProtCol class 318, FIG. 3, contain a decode method, and thus, they know how to decode themselves. When a message 340 is told to decode itself, it follows the message descriptor chain, calling the decode method of the next lower object. Since each object knows how to decode itself, the object does the appropriate thing; either calling other decode methods for objects that compose it, or, in the case that this object is at the lowest level, it simply decodes it and returns. It must, however, have a place to put the data it decodes. Therefore, the message structure, or the piece of it that applies to the particular field, is passed as an argument to the decode method for storing the data.

Encoding: When a message is sent to the SUT 102, FIG. 1, the message is encoded per protocol rules. A template is the representation of the message as it appears in the system. The implemented system internally converts messages from template form to the form dictated by the protocol. The encoder 126, FIG. 1, determines the message that will be constructed from the ASN.1 specification 107. Next, the encoder 126 traverses the link list built by the dependent component, then formats a corresponding bit stream for output.

The dependent section of the translator 105 accepts the expanded ASN.1 specification 107 as input. The dependent section of the translator 105 processes the input file one line at a time ignoring the input lines containing comments or unrecognized ASN.1 specification 107. The version user parameter 210 of FIG. 2, enables the translator 107 to choose mnemonics different from earlier version by appending or pre-pending version number to the mnemonic. Version variable is set to the version information. If a line corresponds to the beginning of a message or result, associated structures/classes and operations are generated. If a line contains the beginning of a constructed or primitive type, the translator 105 determines corresponding mnemonic and concatenate it and version variable.

The result is that the translator 105, FIG. 1, constructs a list of all information elements within a message. The translator 105 constructs a message structure that conforms to the tag, and value of the corresponding information elements of the message 340, FIG. 3. The encoder 126, FIG. 1, uses the link list while the decoder 117 uses the message structure.

The filter 109, FIG. 1, is a device that converts an input stream into an output stream. The filter 109 recognizes inputs from the simulator 122 and from the SUT 102 and performs a variety of actions on these inputs like modifying the message, deleting the message, sending a different message, or sending an additional message. The filter 109 also supplies capabilities that are controlled by the user (based on user command) like initialization, termination, and sending messages to the SUT 102 and to the simulator 122.

Filters—Message Decoding:

The filter 109 provides the decoding of messages from the SUT 102.

When a primitive/message is received from the SUT 102, it is automatically decoded per protocol rules. When a primitive/message is received from the SUT 102, it automatically sets a rcvd_prim variable to the base of the protocol stack 116 for the received primitive/message.

The template of the primitive at the base of the protocol stack 116 for the primitive or message that caused the event to trigger is stored in the global variable rcvd_prim when an event is triggered. rcvd_prim will be set using the proper template for the primitive/message just received.

Filters—Message Encoding:

When a message is sent to the SUT 102, it is encoded per protocol rules. A template is the representation of the message as it appears in the system. The implemented system internally converts messages from template form to the form dictated by the protocol through the language processor 120, FIG. 1.

Referring now to FIG. 5, the processing for performing the steps of translation for automatically generating test tools in response to receipt of a device communication specification 107, FIG. 1, at the translator 105 begins in step 505. In step 510, FIG. 5, the translator 107 determines if additional device specification such as ASN.1 specification exists. If there is no more specification, then in step 512 the processing ends. If more device specification is to be processed, then in step 514 the translator performs the steps of pre-translation as described with reference to FIG. 2. The processing then determines if device code option is selected or is required in step 516. If device code translation is to be performed, then the processing proceeds to step 522.

In step 522, FIG. 5, the processing at the translator 105, FIG. 1, determines if an end of file has been encountered from the specification. End of file signifies the end of an expanded ASN.1 file. If the translator 105, FIG. 1, encounters the end of file (EOF), in step 524, FIG. 5, it closes the output file and exists if there are no more specifications to process as seen in steps 510 and 512. If the end of file is not reached, the translator obtains a line of input and parses it into tokens as seen in step 526. Information contained in the tokens includes whether the current line is the beginning of a message, a constructed type or a primitive type; if the field is optional, implicit, length of the field, etc.

When the translator 105, FIG. 1, encounters a message as seen in step 528, FIG. 5, it updates the current message pointer to the current message and generates a message 410, FIG. 4, template thereby processing the message as seen in step 530. Message template includes functions and data structures to hold and manage this type of message. Some of the information contained in the message template includes the message type, message length, list of message elements.

When the translator 105, FIG. 1, encounters a constructed type as seen in step 532, 1) it updates current constructed pointer to the current one; 2) determines the name and symbol of this field; 3) determines whether field is optional or mandatory, and if implicit; 4) calculate the tab. This processing of the constructed type of line, step 534, FIG. 5, is recursive, since constructed type could have other constructed types as fields. This information is used to populate the content of ProtCol 318, FIG. 3, while constructing the link list of information element.

When the translator 105 encounters a primitive type as seen in step 536, FIG. 5, 1) it updates current field pointer to the current field; 2) determines the name and symbol of this field; 3) determines whether field is optional or mandatory, and if implicit; 4) calculates the tag. This information when processing a primitive type, step 538, FIG. 5, is used to populate the content of ProtCol 318, FIG. 3, while constructing the link list of information element.

After processing a line of input, the translator 105 determines if output is needed in step 540, FIG. 5, and if so, in step 542, writes to the output file, if necessary, and fetches another line of input until the end of file step 522 is reached.

In step 518, FIG. 5, the translator 105, FIG. 1, determines if filter generation is desired. If automatic filter generation is desired, then the processing proceeds to step 522.

One of the differences between an automatically generated simulator 122 and filter 109 is that a user could write a filter based test scenario suitable for a particular application, while simulators tend to test common, typical scenarios. With filter a user may selectively specify values that do not meet specification or even send wrong messages to ascertain the behavior of the system under test 102, FIG. 1, under these conditions.

If the translator 105 encounters the EOF in step 522, it closes the output file and exits if there are no more specifications to process. If end of file is not reached, the translator obtains a line of input and parses it into tokens in step 526. Information contained in the tokens includes whether the current line is the beginning of a message constructed or primitive type, if the field is optional, implicit and length of the field, etc.

When the translator 105, FIG. 1, encounters a message in step 528, FIG. 5, it updates the current message pointer to the current message and generates a filter message template thereby processing the message, step 530. Templates consist of the message type followed by a list of pairs of the form: fieldname fieldvalue. Templates are created with all fieldvalues EMPTY, i.e. with no value, except MSGTYPE, which has the name of the message stored as a character string. Storage for a message is defined when a template is "put" into a variable, e.g. put NDATAREQ template into myndatareq.

When the translator 105, FIG. 1, encounters a constructed type in step 532, FIG. 5, 1) it updates current constructed pointer to the current one; 2) determines the name and symbol of this field; 3) determines whether field optional or mandatory, and if implicit; 4) calculates the tag; 5) determine whether user wants to test upper bounds, lower bounds or out of range values. This processing of the constructed type, step 534, is recursive, since constructed type could have other constructed types as fields. This data is used to populate the fieldvalue of the template. When the translator encounters a primitive type, 1) it updates the current constructed pointer to the current one; 2) determines the name and symbol of the field; 3) determines whether the field is optional or mandatory, and if it is implicit; 4) calculates the tag; 5) determines whether the user wants to test upper bounds, lower bounds or out of range values. This data is used to populate the field value of the template.

In step 520, FIG. 5, if the translator determines that a user guide is desired to be automatically generated, then the processing proceeds to step 522.

If the translator 105, FIG. 1, encounters the EOF in step 522, it closes the output file in step 524 and exits if there are no more specifications to process as seen in steps 510 and 512. If end of file is not reached, the translator obtains a line of input and parses it into tokens in step 528. Information contained in the tokens includes whether the current line is the beginning of a message, constructed or primitive type; if the field is optional, implicit and length of the field, etc. When the translator 105 encounters a message in step 528, it updates the current message pointer to the current message and moves the input file pointer forward and then back to determine how many fields are associated with the current message thereby processing the message in step 530. This information enables the translator to generate a table large enough to represent the content of the current message. The translator 105 also writes the table header which includes system mnemonic, field type and field value.

When the translator 105, FIG. 1, encounters a constructed type in step 532, FIG. 5, it updates the current constructed type pointer to the current field. It adjusts the output pointer, outputs the field mnemonic, field type, whether optional and value range to process the constructed type in step 534.

When the translator 105 encounters a primitive type in step 536, it updates the current primitive type pointer to the current field. It adjusts the output pointer, outputs the field mnemonic, field type, whether optional and value range when processing the primitive type in step 538.

In step 540, FIG. 5, after processing a line of input, the translator determines if the information is to be written to an output file. In step 542, the translator writes to the output file. Otherwise, if necessary, the translator obtains another line of input by proceeding to step 522 until the end of file is reached.

While a detailed description of the preferred embodiments of the invention has been given, it should be appreciated that many variations can be made thereto without departing from the scope of the invention as set forth in the appended claims.

What is claimed is:

1. In a system for testing a communication network component connected to a computer controlled apparatus, the communication network component and the computer controlled apparatus each being connected to a data link, a method of automatically simulating telephonic communication with the communication network component comprising the steps of:

providing a device communication specification at the computer controlled apparatus;

sending the device communication specification to a translator device at the computer controlled apparatus;

automatically parsing the device communication specification to enable development of test tools for the simulation of telephonic communication between the computer controlled apparatus and the communication network component; and automatically generating test tools for use in testing the communication network component.

2. The method of claim 1 in which the device communication specification is an abstract syntax notation one (ASN.1) specification.

3. The method of claim 2 in which the step of automatically generating test tools includes the step of automatically generating a computer software based model to simulate a network entity in response to receipt of the ASN.1 specification at the translator device.

4. The method of claim 2 including the step of automatically generating test scripts in the form of computer software based test scenarios to simulate telephonic actions.

5. The method of claim 2 including the step of automatically developing a user documentation guide in response to receipt of the ASN.1 specification at the translator device.

6. The method of claim 3 in which the simulated network entity in the form of a computer software based model is a simulation of at least one of:

(a) a telephonic network switch, (b) a database, (c) a wireless base station, and (d) a telephone set.

7. The method of claim 3 including the step of automatically generating the computer software based model in C++ executable software code to simulate the behavior of the network entity.

8. The method of claim 4 in which the telephonic actions include at least one of (a) registering a mobile telephonic unit, (b) dialing a telephonic number, and (c) going off-hook.

9. The method of claim 4 in which the step of automatically generating test scripts includes the step of automatically creating an event driven software program in a tool control language for establishing test scenarios.

10. The method of claim 5 in which the step of automatically developing the user documentation guide includes the step of generating the user guide in a NROFF/TROFF document format.

11. A system for testing a communication network component connected to a computer controlled apparatus, the communication network component and the computer controlled apparatus being connected to a data link comprising:

a memory device for storing a device communication specification;

a translator device at the computer controlled apparatus having an input for receipt of the device communication specification in which the translator device automatically parses the device communication specification to enable development of test tools for the simulation of telephonic communication between the computer controlled apparatus and the communication network component; and means at the translator for automatically generating test tools for use in testing the communication network component.

12. The system of claim 11 in which the device communication specification is an abstract syntax notation one (ASN.1) specification.

13. The system of claim 12 in which the translator automatically generates a computer software based model to simulate a network entity in response to receipt of the ASN.1 specification at the translator device.

14. The system of claim 12 including means for automatically generating test scripts in the form of computer software based test scenarios to simulate telephonic actions.

15. The system of claim 12 including means for automatically developing a user documentation guide in response to receipt of the ASN.1 specification at the translator device.

16. The system of claim 13 in which the simulated network entity in the form of a computer software based model is a simulation of at least one of:
 (a) a telephonic network switch,
 (b) a database,
 (c) a wireless base station, and
 (d) a telephone set.

17. The system of claim 13 in which the translator automatically generates the computer software based model in C++ executable software code to simulate the behavior of the network entity.

18. The system of claim 14 in which the telephonic actions include at least one of:
 (a) registering a mobile telephonic unit,
 (b) dialing a telephonic number, and
 (c) going off-hook.

19. The system of claim 14 including means for automatically creating an event driven software program in a tool control language for establishing test scenarios.

20. The system of claim 15 in which the user guide is generated in a NROFF/TROFF document format.

\* \* \* \* \*